(12) United States Patent
Zhang et al.

(10) Patent No.: US 8,001,556 B2
(45) Date of Patent: Aug. 16, 2011

(54) MEDIA DEVICE WITH A DISC TRAY MOVED BY TWO MOTORS

(75) Inventors: Erik Yi Zhang, San Diego, CA (US);
Mark McGarry, San Diego, CA (US);
Rad Wang, Chandler, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 974 days.

(21) Appl. No.: 11/974,843

(22) Filed: Oct. 15, 2007

(65) Prior Publication Data

US 2009/0100449 A1    Apr. 16, 2009

(51) Int. Cl.
*G11B 17/03* (2006.01)
*G11B 17/04* (2006.01)
*G11B 33/02* (2006.01)

(52) U.S. Cl. ........................................ 720/601; 720/606
(58) Field of Classification Search ................. 720/600, 720/601, 602, 606, 613, 614
See application file for complete search history.

(56) References Cited

U.S. PATENT DOCUMENTS

| | | | | |
|---|---|---|---|---|
| 5,218,592 | A * | 6/1993 | Isshiki et al. | 720/615 |
| 5,467,334 | A | 11/1995 | Kim | |
| 5,847,901 | A | 12/1998 | Hirsch | |
| 2005/0286359 | A1 | 12/2005 | Ezawa | |
| 2006/0097443 | A1 | 5/2006 | Choi | |
| 2006/0285447 | A1 | 12/2006 | Sherman | |

* cited by examiner

*Primary Examiner* — Craig A. Renner
*Assistant Examiner* — Gustavo Polo

(57) ABSTRACT

A media device includes a disc tray moved by two motors. The media device includes a disc tray movable along an axis of movement and including a first coupling structure; a first motor operatively connected to a second coupling structure configured for coupling with the first coupling structure to move the disc tray along the axis of movement; and a second motor operatively connected to a third coupling structure configured for coupling with the first coupling structure to move the disc tray along the axis of movement.

20 Claims, 2 Drawing Sheets

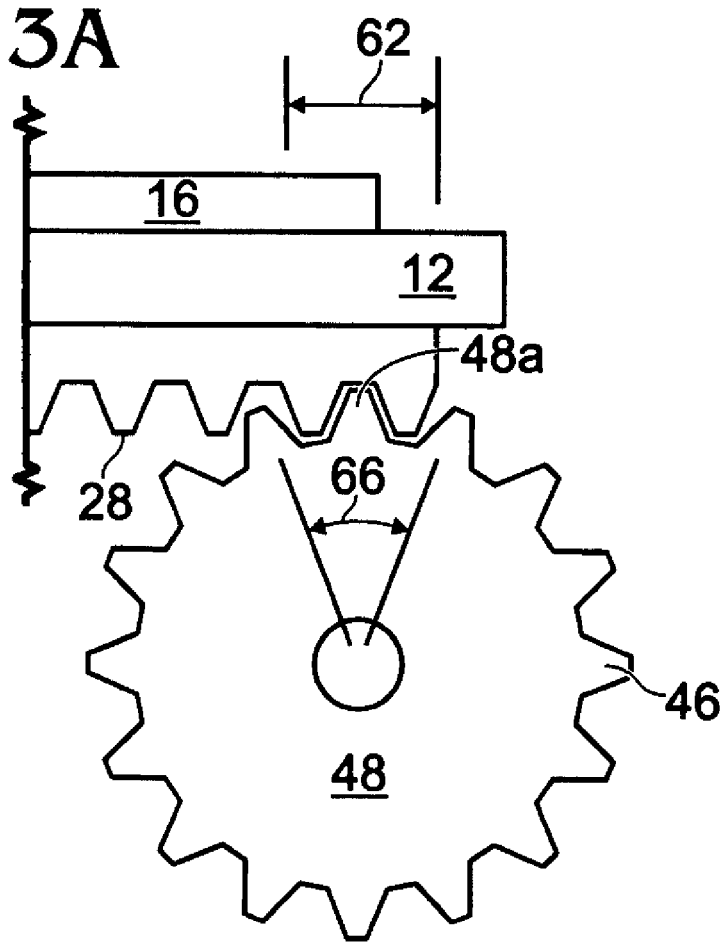

MEDIA DEVICE WITH A DISC TRAY MOVED BY TWO MOTORS

BACKGROUND

Media devices may include media disc trays for moving a media diskette into the media device, through a work zone, to a non-work zone, and out of the media device. It may be desirable to use a media disc tray motor efficiently while the media disc tray is in the media device.

BRIEF DESCRIPTION OF THE DRAWINGS

FIG. 3A is an enlarged view of the interaction between the media disc tray and a gear when the device is in the hand-off position illustrated in FIG. 3.

DETAILED DESCRIPTION OF THE DRAWINGS

Figure 1:
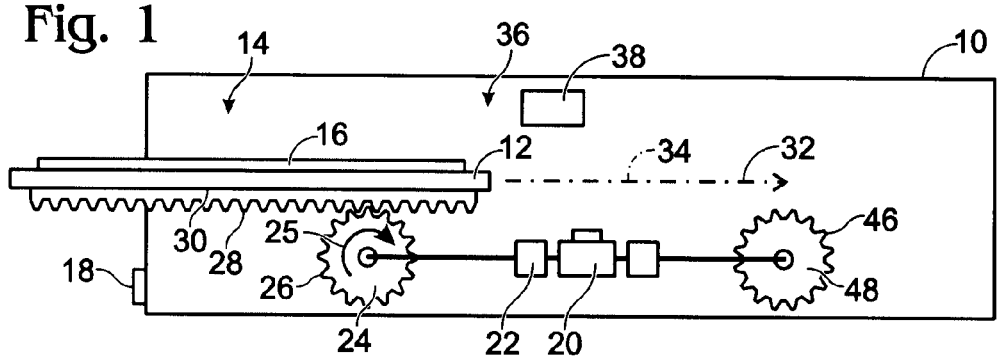
FIG. 1 is a schematic side view of one example embodiment of a media device with a media disc tray in an input position.

FIG. 1 is a schematic side view of one example embodiment of a media device 10 with a media disc tray 12 in an input position 14. In this input position 14 a portion of media disc tray 12 may extend outwardly of media device 10 such that a media disc 16 may be placed by an operator (not shown) on media disc tray 12. Thereafter, the operator may depress a media disc tray button 18 to signal a controller 20 that media disc 16 is loaded. Controller 20 may then operate a first motor 22 which may turn a first gear 24 in a forward direction 25. First gear 24 may include a coupling device, such as teeth 26, thereon that may couple with a coupling device, such as a rack of teeth 28, on an underside 30 of media disc tray 12. This may result in movement of media disc tray 12, with media disc 16 positioned thereon, in a linear direction 32 along an axis of movement 34. Motor 22 may continue to turn first gear 24 to move media disc tray 12 out of input position 14 and into a work position 36, as shown in FIG. 2.

Figure 2:
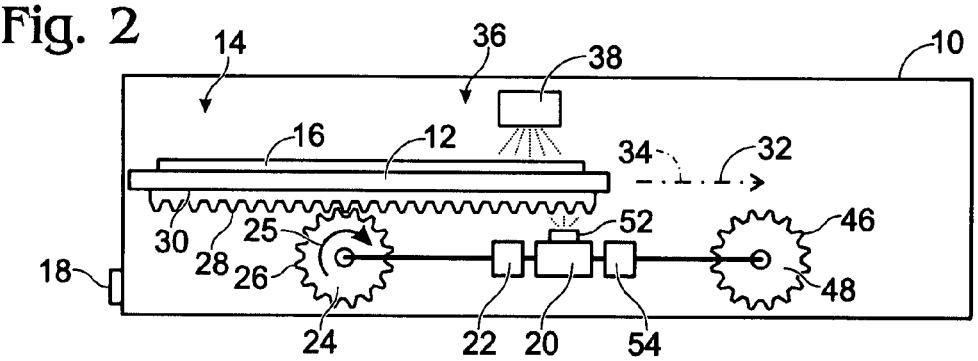
FIG. 2 is a schematic side view of one example embodiment of a media device with a media disc tray in a work position.

FIG. 2 is a schematic side view of one example embodiment of media device 10 with media disc tray 12 moved into work position 36 and adjacent a work structure 38. In an embodiment wherein media device 10 is a compact diskette (CD) or a digital versatile disc (DVD) player, work structure 38 may be a CD or a DVD reader. In an embodiment wherein media device 10 is a CD or DVD burner, work structure 38 may be a CD or DVD recording or printing device. In other embodiments work structure 38 may be other devices or a combination of devices for a particular application. After media disc 16 is worked upon by work structure 38, it may be desirable to move media disc 16 to a non-work position 42 (see FIG. 4) within media device 10. Movement of media disc 16 through a hand-off position 40 and to non-work position 42, will now be described with respect to FIGS. 3 and 4.

Figure 3:
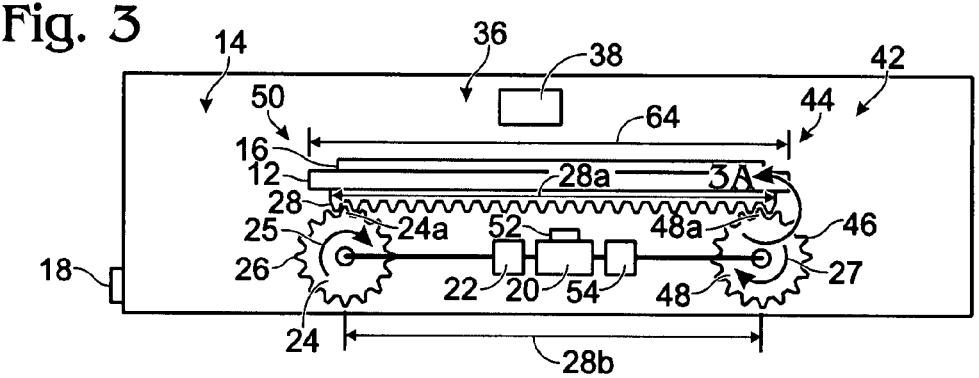
FIG. 3 is a schematic side view of one example embodiment of a media device with a media disc tray in a hand-off position.

FIG. 3 is a schematic side view of one example embodiment of media device 10 with media disc tray 12 in hand-off position 40. In hand-off position 40 a first end region 44 of rack of teeth 28 is just in contact with a coupling device, such as teeth 46, on a second gear 48. In other words, in hand-off position 40 only one or two teeth of teeth 46 of second gear 48 may be in contact with only one or two teeth of rack of teeth 28 of media disc tray 12 in first end region 44. Simultaneously, a second end region 50 of rack of teeth 28 is just in contact with the coupling device, such as teeth 26, on first gear 24. In other words, in hand-off position 40 only one or two teeth of teeth 26 of first gear 24 may be in contact with only one or two teeth of rack of teeth 28 of media disc tray 12 in second end region 50.

To move media disc tray 12 into hand-off position 40, controller 20 may activate a position sensor 52 to determine a position of media disc tray 12 along axis of movement 34. When media disc tray 12 is moved through or into a predetermined position along axis of movement 34, as sensed by position sensor 52, controller 20 may activate movement of second gear 48 in a forward direction 27 by a second motor 54, which may be controlled and operated independently of first motor 22 and first gear 24. Movement of second gear 48 may be synchronized with movement of first gear 24 by firmware and/or software 56 within controller 20 such that as first gear 24 moves media disc tray 12 in direction 32, rack of teeth 28 of media disc tray 12 will couple with teeth 46, on second gear 48. Firmware and/or software 56 may take into account and may allow control of the rotational speed of each of first gear 24 controlled by first motor 22 and second gear 48 controlled by second motor 54, the teeth alignment on the first and second gears 24 and 48 and on rack of teeth 28, and the distance 28b between the gears 24 and 48, i.e., the length of rack of teeth 28 between the first and second gears 24 and 48.

In one example embodiment, the firmware controls the rotational speed of the second gear 48 through second motor 54 to be slightly faster than that of the first gear 24 to facilitate perfect meshing between rack of teeth 28 and teeth 46 on gear 48. In another example embodiment, a length 28a of rack of teeth 28 may define substantially the same distance as a distance 28b between teeth 24a at a top position of first gear 24 that contact rack 28 and teeth 48a at a top position of second gear 48 that contact rack 28. In other words, the length 28a of rack of teeth 28 may be equal to the spacing 28b of first and second gears 24 and 48, as measured at the top, center position of the gears. In other embodiments, other variables may be taken in account during calculations by firmware and/or software 56 and controller 20 to achieve a smooth hand-off or transition of media disc tray 12 from one independently operated gear to another.

Media disc tray 12, therefore, may continue to move in direction 32 under the power of both first gear 24 and second gear 48 for short period of time, less than one second, for example, as media disc tray 12 is moved through hand-off position 40. In one example embodiment, the short period of time of the hand-off of media disc tray 12 between the first and second gears 24 and 48 may be defined as the rack being simultaneously coupled to both the first and second toothed gears 24 and 48 during a lineal distance 62 (FIG. 3A) along a length 64 (FIG. 3) of media disc tray 12, wherein lineal distance 62 may be only a few millimeters, and of an angle 66 of less than five degrees of rotation of each of said first and second toothed gears 24 and 48, for example. Of course the time and length of simultaneous contact with first and second gears 24 and 48 may vary depending on the size of the media disc tray 12, the size of the gears 24 and 28, and the size of the coupling structures, such as the teeth, on the rack of teeth 28 and on first and second gears 24 and 48.

After the very short time period of media disc tray 12 is in the hand-off position 40, i.e., after the very short time period that both first gear 24 and second gear 48 are in contact with rack of teeth 28, rack of teeth 28 will move off first gear 24 such that media disc tray 12 is powered only by second gear 48 and second motor 54. Second gear 48 may continue to move media disc tray 12 in direction 32 such that media disc tray 12 is moved completely out of work position 36 and into non-work position 42, such that media disc tray 12 is moved out from a position adjacent work structure 38, as shown in FIG. 4.

Figure 4:
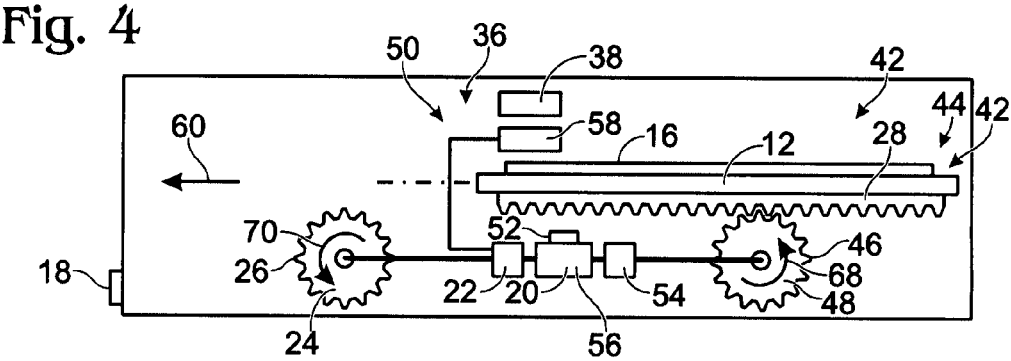
FIG. 4 is a schematic side view of one example embodiment of a media device with a media disc tray in a non-work position.

FIG. 4 is a schematic side view of one example embodiment of media device 10 with media disc tray 12 positioned in non-work position 42, which may also be referred to as a park position. In this non-work position 42, media disc tray 12 is operated, i.e., controlled and moved, only by second gear 48 and second motor 54, and is not in contact with first gear 24 or first motor 22, such that first gear 24 and first motor 22 may operate another structure, such as a servicing structure 58, without moving media disc tray 12. In the embodiment shown, servicing structure 58 is shown operatively connected to first gear 24 and first motor 22, such that servicing structure 58 may be utilized to service work structure 38 by operation of first gear 24 and first motor 22, for example. After a predetermined time period, such as after servicing of work structure 38 by servicing structure 58, for example, it may be desirable to move media disc tray 12 to input position 14.

Referring to FIGS. 1-4, movement of media disc tray 12 from non-work position 42 to input position 14 may be described as a reversal of the operations conducted to move media disc tray 12 from input position 14 to non-work position 42. In particular, second gear 48 may be operated in a reverse direction 68 by second motor 54 to move media disc tray 12 in a direction 60 along axis of movement 34. To move media disc tray 12 back into hand-off position 40, controller 20 may activate position sensor 52 to determine a position of media disc tray 12 along axis of movement 34. When media disc tray 12 is moved through or into a predetermined position along axis of movement 34, as sensed by position sensor 52, controller 20 may activate reverse movement of first gear 24 in a reverse direction 70 by first motor 22, which may be controlled and operated independently of second motor 54 and second gear 48. Reverse movement of first gear 24 may be synchronized with reverse movement of second gear 48 by firmware and/or software 56 within controller 20 such that as second gear 48 moves media disc tray 12 in direction 60, rack of teeth 28 of media disc tray 12 will couple with teeth 26, on first gear 24. Media disc tray 12, therefore, may continue to move in direction 60 under the power of both first gear 24 and second gear 48 for short period of time, less than one second, for example, as media disc tray 12 is moved back through hand-off position 40. After the very short time period of hand-off position 40, i.e., after the very short time period that both first gear 24 and second gear 48 are in contact with rack of teeth 28, rack of teeth 28 will move off second gear 48 such that media disc tray 12 is powered only by first gear 24 and first motor 22. First gear 24 may continue to move media disc tray 12 in direction 60 such that media disc tray 12 is moved out of work position 36 and into input position 14, such that media disc tray 12 is moved partly outwardly from media device 10, as shown in FIG. 1.

In one example embodiment, first motor 22 may be a paper motor, such as that used to move paper in a printing device, and second motor 54 may be a pick-up motor. In other embodiments, input position 14 may be defined as media disc tray being positioned substantially outwardly or substantially inwardly of media device 10.

Other variations and modifications of the concepts described herein may be utilized and fall within the scope of the claims below.

We claim:

1. A media device, comprising:
   a disc tray movable along an axis of movement and including a first coupling structure;
   a first motor operatively connected to a second coupling structure adapted for coupling with said first coupling structure to move said disc tray along said axis of movement; and
   a second motor operatively connected to a third coupling structure adapted for coupling with said first coupling structure to move said disc tray along said axis of movement.

2. The device of claim 1 wherein said first coupling structure defines a rack of teeth positioned on said disc tray.

3. The device of claim 2 wherein said rack defines a length and wherein said second and third coupling structures are spaced apart a distance equal to said length.

4. The device of claim 1 further comprising a position sensor and a controller, wherein said position sensor senses position information of said disc tray, and wherein said controller receives said position information of said disc tray from said position sensor and controls said first and second motors to coordinate movement of said disc tray between said second and third coupling structures.

5. The device of claim 1 wherein said disc tray is adapted for supporting a disc chosen from one of a CD and a DVD.

6. The device of claim 2 wherein said second coupling structure defines a first toothed gear, wherein said third coupling structure defines a second toothed gear and wherein said rack of teeth and said first and second toothed gears are spaced such that said rack simultaneously is coupled to both said first and second toothed gears during a lineal distance along a length of said disc tray of less than five degrees of rotation of each of said first and second toothed gears.

7. The device of claim 1 wherein said disc tray is moved by contact of said second coupling structure with said first second coupling structure to a handoff position wherein said disc tray is handed off from said second coupling structure to said third coupling structure.

8. A media device, comprising:
   support means for supporting a media diskette;
   first driving means for driving said support means; and
   second driving means for driving said support means,
   wherein said first driving means and said second driving means are operated independently of one another.

9. The device of claim 8 wherein said first driving means comprises a first toothed gear moved by a first motor, and wherein said second driving means comprises a second toothed gear moved by a second motor different from said first motor.

10. The device of claim 8 wherein said first and second driving means simultaneously contact said support means only during a handoff phase of movement of said support means.

11. The device of claim 8 further comprising means for sensing a position of said support means, said means for sensing operatively connected to a means for controlling said first and second driving means.

12. The device of claim 8 wherein said first driving means is disengaged from said support means while said second driving means is engaged with said support means, and wherein said second driving means is disengaged from said support means while said first driving means is engaged with said support means.

13. The device of claim 12 wherein said first driving means drives a servicing means when disengaged from said support means.

14. The device of claim 8 wherein said first driving means is a paper motor and wherein said second driving means is a pick up motor.

15. A method of driving a media disc tray, comprising:
engaging a media disc tray with a first motor;
operating said first motor to move said media disc tray into a first zone;
synchronizing operation of said first motor and a second motor; and
operating said first motor to move said media disc tray into engagement with said second motor whereupon said second motor moves said media disc tray out of engagement with said first motor and into a second zone.

16. The method of claim 15 wherein said first zone comprises a print zone and wherein said second zone comprises a park zone.

17. The method of claim 15 further comprising:
synchronizing operation of said first motor and said second motor; and
operating said second motor to move said media disc tray into engagement with said first motor whereupon said first motor moves said media disc tray out of engagement with said second motor and into said first zone.

18. The method of claim 15 wherein said synchronizing operation of said first motor and said second motor is conducted by a controller including software.

19. The method of claim 15 further comprising operating said first motor to power a servicing device while said media disk tray is out of engagement with said first motor.

20. The method of claim 17 wherein said synchronizing operation is conducted by at least one of firmware and software.

* * * * *